United States Patent Office 3,342,819
Patented Sept. 19, 1967

3,342,819
NOVEL 6,7-DIHYDRO-5H-PYRROLO[3,4-d] PYRIMIDINES
Gerhard Ohnacker, Biberach, Riss, Germany, assignor to Boehringer Ingelheim G.m.b.H., Ingelheim am Rhine, Germany, a corporation of Germany
No Drawing. Filed July 24, 1964, Ser. No. 385,070
The portion of the term of the patent subsequent to June 1, 1982, has been disclaimed
10 Claims. (Cl. 260—256.4)

This invention relates to novel 6,7-dihydro-5H-pyrrolo [3,4-d]pyrimidine substitution products and addition salts thereof, as well as to a process of preparing these compounds.

More particularly, the present invention relates to 6,7-dihydro-5H-pyrrolo[3,4-d]pyrimidine substitution products of the formula

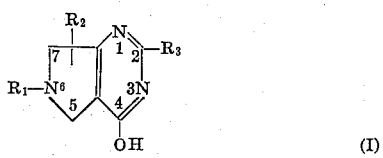

(I)

wherein
$R_1$ is straight or branched alkyl, alkenyl or aralkyl,
$R_2$ is hydrogen or alkyl, and
$R_3$ is straight or branched alkyl, aryl, aralkyl, alkylthio or amino of the formula

where $R_4$ and $R_5$, which may be identical to or different from each other, are hydrogen, straight or branched alkyl, hydroxyalkyl, alkenyl, aralkyl or aryl or, together with each other and the adjacent nitrogen atom, form a basic heterocyclic ring which may have one or more alkyl or aryl substituents attached thereto,
and their non-toxic pharmacologically acceptable addition salts.

The compounds of the Formula I may be prepared by reacting a 3-carbalkoxy-pyrrolidone-(4) of the formula

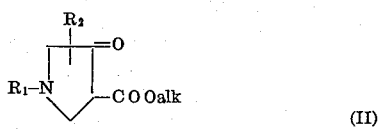

(II)

wherein $R_1$ and $R_2$ have the same meanings as in Formula I and alk is lower alkyl, with an amidine of the formula

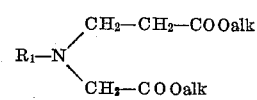

(III)

wherein $R_3$ has the same meanings as in Formula I, in the presence of a solvent which is inert with respect to the reactants as well as the reaction product and preferably at a temperature between 10 and 100° C. Examples of particularly suitable inert solvents are water, lower alkanols, ether, dioxane, tetrahydrofuran and orthoformic acid lower alkyl esters.

The reactants II and III are preferably used in the form of acid addition salts, such as their hydrochlorides, in which case an acid-binding compound, that is, a compound capable of tying up or neutralizing an acid, must be added to the reaction mixture; examples of suitable such acid-binding compounds are alkali metal hydroxides, alkali metal carbonates and alkali metal alcoholates.

However, the reaction may also be carried out between an alkali metal enolate of the carbalkoxy-pyrrolidone II and an acid addition salt of the amidine III; under these circumstances it is not necessary to add an acid-binding compound to the reaction mixture.

The reaction mixture may be worked up by customary methods and the reaction product may be isolated by adjusting an aqueous solution thereof to a weakly alkaline pH, whereby it precipitates.

Those compounds of the Formula I thus obtained which are bases may, if desired, be converted into their non-toxic, pharmacologically acceptable acid addition salts by customary methods, for instance, by acidifying a solution of the free base with the desired inorganic or organic acid. Examples of non-toxic, pharmacologically acceptable acid addition salts are those formed with hydrochloric acid, sulfuric acid, phosphoric acid, tartaric acid, maleic acid, succinic acid, citric acid, fumaric acid, 8-chlorotheophylline and the like. On the other hand, those compounds of the Formula I which are acids may be converted into non-toxic, pharmacologically acceptable addition salts with bases, for instance, by adding one or more equivalents of the desired base. Examples of non-toxic, pharmacologically acceptable addition salts with bases are those formed with alkali metal hydroxides, alkali metal carbonates, monoethanolamine, diethanolamine, diethylamine, triethylamine and the like.

The 3-carbalkoxy-pyrrolidones-(4) of the Formula II above, which are used as starting materials for the preparation of the novel compounds of the present invention, are described in the literature or may be prepared by methods described in the literature. For instance, they may be prepared by the process disclosed by J. F. Cavalla et al. in J. Med. Chem. 4, pp. 4–8 (1961) which involves Dieckmann cyclization of a dicarboxylic acid lower alkyl ester of the formula

wherein $R_1$ has the same meanings as in Formula I and alk is lower alkyl.

Using this process, the following 3-carbethoxy-pyrrolidones-(4) of the Formula II, which have not yet been specifically disclosed in the prior art, were prepared:

(a) 1-n-hexyl-3-carbethoxy-pyrrolidone-(4); its hydrochloride had a melting point of 126° C.
(b) 1-benzyl-3-carbethoxy-pyrrolidone-(4); its hydrochloride had a melting point of 137° C.
(c) 1 - benzyl - 3 - carbethoxy-5-methyl-pyrrolidone-(4); its hydrochloride had a melting point of 116° C.
(d) 1 - ($\beta$-phenylethyl)-3-carbethoxy-pyrrolidone-(4); its hydrochloride had a melting point of 153–154° C.
(e) 1 - ($\alpha$-phenylethyl)-3-carbethoxy-pyrrolidone-(4); its hydrochloride had a melting point of 154° C.

The following examples further illustrate the present invention and will enable others skilled in the art to understand the invention more completely. It should be understood, however, that my invention is not limited to the particular examples given below.

*Example 1*

8.5 gm. of 1-benzyl-3-carbethoxy-pyrrolidone-(4) and 7.4 gm. of isobutyramidine hydrochloride were added to a soution of 2.1 gm. of metallic sodium in 100 cc. of absolute ethanol, and the resulting mixture was stirred for 24 hours at room temperature. Thereafter, the ethanol was distilled off in vacuo, the residue was dissolved in 150 cc. of water, and the aqueous solution was extracted several times with ether. The ether extracts were discarded, and the aqueous phase was first acidified with 2 N hydrochloric acid and then admixed with an aqueous saturated solution of sodium bicarbonate until no more carbon dioxide was formed. The precipitate formed thereby was separated by vacuum filtration and was recrystallized from methanol. The product, having a melting point of 186–187° C., was identified to be 2-isopropyl-4-hydroxy - 6 - benzyl-6,7-dihydro-(5H)-pyrrolo[3,4-d]pyrimidine of the formula

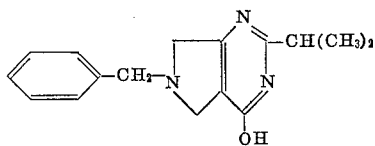

*Example 2*

12.5 gm. of the sodium enolate of 1-(β-phenylethyl)-3-carbethoxy-pyrrolidone-(4) and 8.1 gm. of n-butyramidine hydrochloride were dissolved in 150 cc. of absolute ethanol, and the resulting solution was refluxed for eight hours. Thereafter, the ethanol was distilled off, the residue was taken up in 200 cc. of water, and the resulting solution was extracted three times with ether. The ether extracts were discarded, and the aqueous phase was first made just acid with 2 N acetic acid and then weakly alkaline with sodium bicarbonate. The precipitate formed thereby was separated by filtration and was recrystallized from a mixture of benzene and ligroin. The product, having a melting point of 122° C., was identified to be 2 - n - propyl - 4-hydroxy-6-(β-phenylethyl)-6,7-dihydro-(5H)-pyrrolo[3,4-d]pyrimidine of the formula

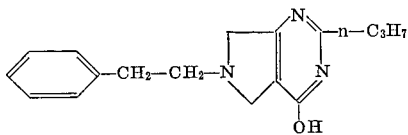

*Example 3*

6 gm. of 1-n-hexyl-3-carbethoxy-pyrrolidone-(4) hydrochloride and 7.3 gm. of phenylacetamidine hydrochloride were dissolved in 80 cc. of orthoformic acid ethyl ester, and the resulting solution was admixed with a concentrated solution of 1.5 gm. of sodium in absolute ethanol. The resulting mixture was stirred for 24 hours at room temperature. Thereafter, the ethanol was distilled off under reduced pressure, the residue was taken up in 100 cc. of water, the aqueous solution was extracted with ether, and the aqueous phase was worked up as described in Example 1. The recrystallized product had a melting point of 141° C. and was identified to be 2-benzyl-4-hydroxy - 6 - n - hexyl-6,7-dihydro-(5H)-pyrrolo[3,4-d] pyrimidine of the formula

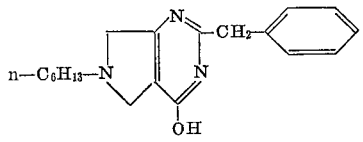

*Example 4*

Using a procedure analogous to that described in Example 3, 2-phenyl-4-hydroxy-6-n-butyl-6,7-dihydro-(5H)-pyrrolo[3,4-d]pyrimidine, M.P. 160–1° C., was prepared from 1-n-butyl-3-carbethoxy-pyrrolidone-(4) hydrochloride and phenylformamidine hydrochloride.

*Example 5*

Using a procedure analogous to that described in Example 3, 2-methyl-4-hydroxy-6-n-hexyl-6,7-dihydro-(5H)-pyrrolo[3,4-d]pyrimidine, M.P. 138° C., was prepared from 1-n-hexyl-3-carbethoxy-pyrrolidone-(4) hydrochloride and acetamidine hydrochloride.

*Example 6*

Using a procedure analogous to that described in Example 3, 2 - n - butyl - 4-hydroxy-6-n-hexyl-6,7-dihydro-(5H)-pyrrolo[3,4-d]pyrimidine, M.P. 94° C., was prepared from 1-n-hexyl-3-carbethoxy-pyrrolidone-(4) hydrochloride and valeramidine hydrochloride.

*Example 7*

Using a procedure analogous to that described in Example 3, 2 - benzyl - 4-hydroxy-6-allyl-6,7-dihydro-(5H)-pyrrolo[3,4-d]pyrimidine, M.P. 168° C., of the formula

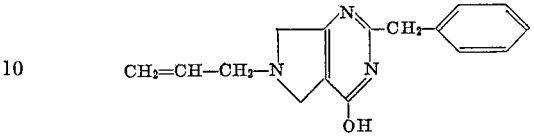

was prepared from 1-allyl-3-carbethoxy-pyrrolidone-(4) hydrochloride and phenylacetamidine hydrochloride.

*Example 8*

Using a procedure analogous to that described in Example 1, 2-ethyl-4-hydroxy-6-benzyl-6,7-dihydro-(5H)-pyrrolo[3,4-d]pyrimidine, M.P. 200° C., was prepared from 1-benzyl-3-carbethoxy-pyrrolidone-(4) and propionamidine hydrochloride.

*Example 9*

Using a procedure analogous to that described in Example 1, 2-n-butyl-4-hydroxy-6-benzyl-6,7-dihydro-(5H)-pyrrolo[3,4-d]pyrimidine, M.P. 148–150° C., was prepared from 1-benzyl-3-carbethoxy-pyrrolidone-(4) and valeramidine hydrochloride.

*Example 10*

Using a procedure analogous to that described in Example 1, 2-methylthio-4 - hydroxy-6-benzyl - 6,7-dihydro-(5H)-pyrrolo[3,4-d]pyrimidine, M.P. 213–215° C., of the formula

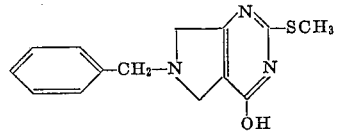

was prepared from 1-benzyl-3-carbethoxy - pyrrolidone-(4) and methylisothiouronium sulfate.

*Example 11*

Using a procedure analogous to that described in Example 1, 2-isopropyl-4-hydroxy-6-benzyl-7-methyl-6,7-dihydro-(5H)-pyrrolo[3,4-d]pyrimidine, M.P. 193° C., of the formula

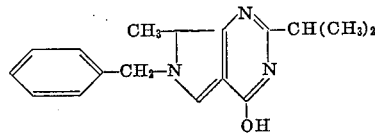

was prepared from 1-benzyl-3-carbethoxy-5-methyl-pyrrolidone-(4) and isobutyramidine hydrochloride.

*Example 12*

Using a procedure analogous to that described in Example 1, 2-n-butyl-4 - hydroxy-6-benzyl - 7-methyl-6,7-dihydro-(5H)-pyrrolo[3,4-d]pyrimidine, M.P. 185° C., was prepared from 1-benzyl-3 - carbethoxy - 5-methyl-pyrrolidone-(4) and valeramidine hydrochloride.

*Example 13*

Using a procedure analogous to that described in Example 1, 2,6-dibenzyl-4 - hydroxy-7-methyl - 6,7-dihydro-(5H)-pyrrolo[3,4-d]pyrimidine, M.P. 251° C., was prepared from 1-benzyl-3-carbethoxy-5-methyl-pyrrolidone-(4) and phenylacetamidine hydrochloride.

*Example 14*

Using a procedure analogous to that described in Example 1, 2-amino-4-hydroxy-6-benzyl-7-methyl-6,7-dihydro-(5H)-pyrrolo[3,4-d]pyrimidine, M.P. higher than 300° C., of the formula

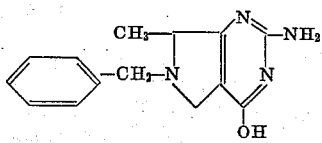

was prepared from 1-benzyl-3-carbethoxy-5-methyl-pyrrolidone-(4) and guanidine hydrochloride.

Example 15

Using a procedure analogous to that described in Example 2, 2-methyl-4-hydroxy-6-(β-phenylethyl)-6,7-dihydro-(5H)-pyrrolo[3,4-d]pyrimidine, M.P. 196° C., was prepared from the sodium enolate of 1-(β-phenylethyl)-3-carbethoxy-pyrrolidone-(4) and acetamidine hydrochloride.

Example 16

Using a procedure analogous to that described in Example 2, 2-ethyl-4-hydroxy-6 - (β-phenylethyl)-6,7-dihydro-(5H)-pyrrolo[3,4-d]pyrimidine, M.P. 171° C., was prepared from the sodium enolate of 1-(β-phenylethyl)-3-carbethoxy-pyrrolidone-(4) and propionamidine hydrochloride.

Example 17

Using a procedure analogous to that described in Example 2, 2-n-butyl-4-hydroxy-6-(β-phenylethyl)-6,7-dihydro-(5H)-pyrrolo[3,4-d]pyrimidine, M.P. 136° C., was prepared from the sodium enolate of 1-(β-phenylethyl)-3-carbethoxy - pyrrolidone-(4) and valeramidine hydrochloride.

Example 18

Using a procedure analogous to that described in Example 2, 2-methylthio-4-hydroxy-6-(β-phenylethyl)-6,7-dihydro - (5H) - pyrrolo[3,4-d]pyrimidine, M.P. 192° C., was prepared from the sodium enolate of 1-(β-phenylethyl) - 3-carbethoxy-pyrrolidone-(4)- and methylisothiouronium sulfate.

Example 19

Using a procedure analogous to that described in Example 2, 2-amino-4-hydroxy-6-(β-phenylethyl)-6,7-dihydro-(5H)-pyrrolo[3,4-d]pyrimidine, M.P. 215° C., was prepared from the sodium enolate of 1-(β-phenylethyl)-3-carbethoxy-pyrrolidone-(4) and guanidine hydrochloride.

Example 20

Using a procedure analogous to that described in Example 2, 2-n-propyl-4-hydroxy-6-(α-phenylethyl)-6,7-dihydro-(5H)-pyrrolo[3,4-d]pyrimidine, M.P. 173–174° C., of the formula

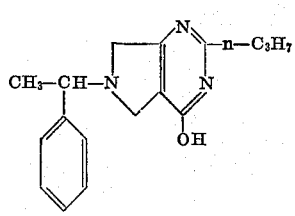

was prepared from the sodium enolate of 1-(α-phenylethyl)-3-carbethoxy-pyrrolidone-(4) and n-butyramidine hydrochloride.

Example 21

Using a procedure analogous to that described in Example 2, 2-n-butyl-4-hydroxy-6-(α-phenylethyl)-6,7-dihydro-(5H)-pyrrolo-[3,4-d]pyrimidine, M.P. 182° C., was prepared from the sodium enolate of 1-(α-phenylethyl)-3-carbethoxy-pyrrolidone-(4) and valeramidine hydrochloride.

The compounds according to the present invention, that is, those embraced by Formula I and their non-toxic, pharmacologically acceptable addition salts formed with inorganic acids or with inorganic or organic bases, have useful pharmacodynamic properties. More particularly, they exhibit antipyretic, antiphlogistic, analgesic, sedative, cardiovascular and cytostatic activities in animals.

For therapeutic purposes, the compounds of the present invention are administered perorally or parenterally as active ingredients in customary dosage unit compositions consisting essentially of an inert carrier and one dosage unit of the active ingredient, such as tablets, coated pills, capsules, suppositories, hypodermic solutions and the like. One dosage unit of the compounds of the invention is 50–250 mgm., preferably 100–200 mgm.

The following examples illustrate a few dosage unit compositions comprising a compound of the invention as an active ingredient. The parts are parts by weight.

Example 22

*Tablets.*—The tablet composition is compounded from the following ingredients:

| | Parts |
|---|---|
| 2-n-propyl - 4 - hydroxy-6-(β-phenylethyl)-6,7-dihydro-(5H)-pyrrolo[3,4-d]pyrimidine | 200.0 |
| Lactose | 60.0 |
| Corn starch | 85.0 |
| Colloidal silicic acid | 10.0 |
| Polyvinylpyrrolidone | 10.0 |
| Talcum | 30.0 |
| Magnesium stearate | 5.0 |
| Total | 400.0 |

*Compounding procedure.*—The pyrrolopyrimidine compound, the lactose, the corn starch, and the silicic acid are thoroughly admixed with each other, the mixture is moistened with an aqueous 8% solution of the polyvinylpyrrolidone, and the moist mass is passed through a 1.5 mm.-mesh screen. The resulting granulate is dried at 40° C. and is again passed through the screen. The dry granulate thus obtained is thoroughly admixed with the talcum and the magnesium stearate, and the mixture is pressed into 400 mgm. tablets. Each tablet contains 200 mgm. of the active ingredient.

Example 23

*Coated pills.*—The tablets prepared in accordance with the preceding example are coated with a thin shell consisting essentially of talcum and sugar, and the coated pills thus obtained are polished with beeswax. Each pill weighs approximately 600 mgm. and contains 200 mgm. of the active ingredient.

Example 24

*Suppositories.*—The suppository composition is compounded from the following ingredients:

| | Parts |
|---|---|
| 2-n-butyl-4-hydroxy - 6 - (β- - phenylethyl) - 6,7-dihydro-(5H)-pyrrolo[3,4-d]pyrimidine | 150.0 |
| Cocoa butter | 1550.0 |
| Total | 1700.0 |

*Compounding procedure.*—The cocoa butter is melted, and at about 40° C. the finely powdered pyrrolopyrimidine compound is stirred in. The mixture is then homogenized, cooled to about 35° C. and poured into cooled suppository molds, each holding 1700 mgm. of the mixture. Each suppository contains 150 mgm. of the active ingredient.

Example 25

*Wafer capsules.*—The contents of the capsules are compounded from the following ingredients:

| | Parts |
|---|---|
| 2-n-butyl - 4 - hydroxy-6-(β-phenylethyl) - 6,7-dihydro-(5H)-pyrrolo[3,4-d]pyrimidine | 100.0 |
| Lactose | 80.0 |
| Talcum | 20.0 |
| Total | 200.0 |

*Compounding procedure.*—The pyrrolopyrimidine compound is passed through a 0.3 mm.-mesh screen and is then thoroughly blended with the remaining ingredients. 200 mgm. portions of the resulting mixture are filled into wafer capsules of suitable size. Each capsule contains 100 mgm. of the active ingredient.

Although the above dosage unit composition examples illustrate only two of the compounds embraced by Formula I as active ingredients, it should be understood that any of the other compounds embraced by said formula or their non-toxic addition salts formed with acids or bases may be substituted for the particular active ingredients in Examples 22 and 25. Moreover, the amount of active ingredient in these examples may be varied within the dosage unit limits set forth above. Similarly, the amounts and nature of the inert ingredients may be varied to meet particular requirements.

While the present invention has been illustrated with the aid of certain specific embodiments thereof, it will be readily apparent to others skilled in the art that my invention is not limited to those particular embodiments, and that various changes and modifications may be made without departing from the spirit of the invention or the scope of the appended claims.

I claim:
1. A compound selected from the group consisting of 4-hydroxy-6,7-dihydro-(5H)-pyrrolo[3,4 - d]pyrimidines of the formula

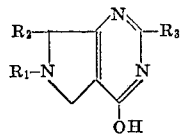

wherein $R_1$ is selected from the group consisting of lower alkyl of 4 to 6 carbon atoms, benzyl, phenylethyl and allyl, $R_2$ is selected from the group consisting of hydrogen and methyl, and $R_3$ is selected from the group consisting of alkyl of 1 to 6 carbon atoms, phenyl, benzyl, methylthio and amino, their non-toxic, pharmacologically acceptable addition salts with acids, and their non-toxic, pharmacologically acceptable addition salts with bases.

2. 2-n-propyl-4-hydroxy-6-(β - phenylethyl)-6,7 - dihydro-(5H)-pyrrolo[3,4-d]pyrimidine.

3. 2-n-butyl-4-hydroxy-6-n-hexyl - 6,7 - dihydro-(5H)-pyrrolo[3,4-d]pyrimidine.

4. 2-ethyl-4-hydroxy-6-benzyl - 6,7 - dihydro - (5H)-pyrrolo[3,4-d]pyrimidine.

5. 2-methyl-4-hydroxy - 6 - (β - phenylethyl)-6,7-dihydro-(5H)-pyrrolo[3,4-d]pyrimidine.

6. 2-n-butyl-4-hydroxy - 6 - (β - phenylethyl)-6,7-dihydro-(5H)-pyrrolo[3,4-d]pyrimidine.

7. 2-methyl-4-hydroxy-6-n-hexyl - 6,7 - dihydro-(5H)-pyrrolo[3,4-d]pyrimidine.

8. 2-n-propyl-4-hydroxy - 6 - (α-phenylethyl)-6,7-dihydro-(5H)-pyrrolo[3,4-d]pyrimidine.

9. 2-benzyl-4-hydroxy-6-allyl - 6,7 - dihydro-(5H)-pyrrolo[3,4-d]pyrimidine.

10. 2-ethyl-4-hydroxy-6-(β - phenylethyl)-6,7-dihydro-(5H)-pyrrolo[3,4-d]pyrimidine.

References Cited

UNITED STATES PATENTS

| | | | |
|---|---|---|---|
| 2,362,614 | 11/1944 | Calva | 167—22 |
| 2,742,397 | 4/1956 | Ott | 167—65 |
| 3,149,112 | 9/1964 | Allen | 260—256.4 |
| 3,181,994 | 5/1965 | Dubnick | 167—65 |
| 3,186,991 | 6/1965 | Ohnacker | 260—256.4 |

FOREIGN PATENTS

| | | |
|---|---|---|
| 811,765 | 4/1959 | Great Britain. |

ALEX MAZEL, *Primary Examiner.*

HENRY R. JILES, *Examiner.*

M. U. O'BRIEN, R. J. GALLAGHER,
*Assistant Examiners.*

UNITED STATES PATENT OFFICE
CERTIFICATE OF CORRECTION

Patent No. 3,342,819  September 19, 1967

Gerhard Ohnacker

It is hereby certified that error appears in the above numbered patent requiring correction and that the said Letters Patent should read as corrected below.

Column 6, line 6, after "inorganic" insert -- or organic --; column 7, line 24, for "and" read -- to --.

Signed and sealed this 15th day of October 1968.

(SEAL)
Attest:

Edward M. Fletcher, Jr.  
Attesting Officer

EDWARD J. BRENNER  
Commissioner of Patents